Figure 1:
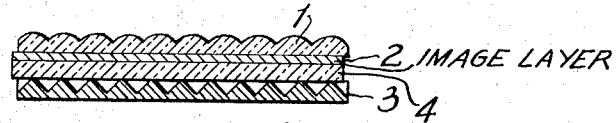

Sept. 19, 1950     M. BONNET     2,522,812

COMPOSITE PHOTOGRAPHIC PICTURE WITH REFLECTING BACK

Filed Dec. 7, 1945

INVENTOR:
Maurice Bonnet

BY
ATTORNEYS

Patented Sept. 19, 1950

2,522,812

UNITED STATES PATENT OFFICE 2,522,812

COMPOSITE PHOTOGRAPHIC PICTURE WITH REFLECTING BACK

Maurice Bonnet, Paris, France, assignor to La Reliephographie, Société pour l'Exploitation des Procédés de Photographie en relief Maurice Bonnet, Paris, France, a French corporation Application December 7, 1945, Serial No. 633,510 In France October 24, 1938

Section 1, Public Law 690, August 8, 1946 Patent expires October 24, 1958

1 Claim. (Cl. 88—1)

The present invention relates to an improved photograph giving the illusion of relief. It constitutes a practical and commercial solution of the problem of relief photography which has hitherto found only an imperfect solution or at least a solution limited to laboratory curiosities.

A photograph giving the impression of relief, which forms the subject matter of the present invention, and which hereinafter is termed a "relief photograph," in order to simplify description, is essentially constituted by a "composite" image, for instance an image obtained through the partial superposition of a plurality of photographs of an object, obtained through the medium of a net, each one of said images differing from the others, only by the differences resulting from the fact that said images have been taken under different angles.

Said composite image is located between a front lenticular selector net, for instance a net cylindrically lined, or again a spherulated net, and a rear opaque surface which is both a reflecting and diffusing surface.

It is this combination of three elements: lenticular net, composite image, and reflecting-diffusing rear surface, which renders possible the production of "relief" photographs imparting their whole effect by ordinary observation in daylight, without the necessity of any rear or top illumination which is otherwise necessary in the forms of execution known at the present time.

The photographs produced according to the invention can be mounted upon a wall, like a simple photograph under glass, or mounted on a table photograph-carrying frame.

The advance in the art achieved by means of this invention is, therefore, considerable.

The hereinafter defined combination has essentially for its object a gain of light, a condition which is indispensable for rendering possible the direct observation of relief photographs obtained through application of the known net method. If one considers the three elements of the combination separately one finds indeed that:

(1) The refrigerant lenticular net produces the optical selection of the images practically without any loss of light, while the hitherto suggested ruled screens cause a loss of light of the order of 90%, since the width of the opaque lines and that of the transparent lines forming the screens used in said application are in practice in the relation of about 10 to 1.

(2) The rear surface is a reflecting surface, in order to absorb as small a quantity as possible of the rays of light which arrive thereon through the emulsion.

A surface which is only reflecting is quite unfit for use, indeed, if a relief photograph according to the invention were to have a mirror as a rear surface and, for example, the observer placed with a source of light (a window for instance) behind him, the observer would in fact only see in the photograph the reflected image of the window, said window image being blurred by the recorded photographic image.

It is for this reason that the surface which is reflecting must also be a diffusing surface, in order to avoid the just mentioned troublesome phenomenon.

(3) Taking into consideration the present state of technical knowledge, in the matter of photographic chemistry, i. e. the necessity of doing away with the dichroic fog, the image layer which generally contains the composite image has a silver concentration which is much lower than that of the image layer which is used at the present time for photographic negatives. It is practically of the same order as that of photographic papers. Thus, the composite image is, though shaded, very transparent, which makes it still possible for a large quantity of light to pass through the image layer and to be then reflected by the rear surface.

One sees thus that a gain of light in the net, a gain of light in the composite image and a gain of light on the rear surface are obtained, the total gain ensuring the possibility of obtaining relief photographs meeting the conditions of direct observation without any additional illumination or apparatus therefor.

Figure 2:
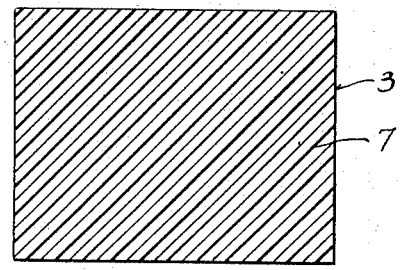
Figure 3:

In the appended drawing which is given only by way of an explanation, and is drawn without any consideration either of scale or of proportions for the sake of clearness:

Fig. 1 is a diagrammatic cross-sectional view showing a preferred embodiment of a relief photograph according to the invention, Fig. 2 is a front view, showing a rear reflecting-diffusing opaque surface according to the invention, and Fig. 3 is a sectional view of such a surface.

As shown in Fig. 1, the photograph according to the invention is constituted by the combination of three elements: the front lenticular selector net 1, the image layer 2 on a transparent supporting layer 4, and the rear reflecting-diffusing opaque surface 3. Of course, the position of the net is fixed with respect to that of the layer carrying the composite image, and both these elements must, therefore, be strictly fast with each other.

The rear reflecting-diffusing opaque surface 3 is preferably corrugated, ribbed or fluted as indicated at numeral 7.

Fig. 2 shows that the striations of the surface 7 are not necessarily parallel to the edges of the photograph. They can be directed obliquely, in order to be perpendicular to the projection, in the plane of the photograph, of the main direction through which the light arrives.

In the form of execution shown in Fig. 3, the section of the striations has a triangular form with unequal sides, in order to reflect to the maximum the light which arrives from a predetermined direction, towards another equally predetermined direction.

It is obvious that, if the reflecting-diffusing surface has not a sufficient rigidity by itself, it will be possible to add to it a back support of any material for insuring its evenness.

Of course, and although it has been mentioned above that the composite image is generally contained in a photographic image layer, it will be possible, without departing from the scope and spirit of the invention, to make relief photographs in which the composite image will have been reproduced by a printing method.

Having now particularly described and ascertained the nature of my said invention, and in what manner the same is to be performed, I declare that what I claim is:

A relief photograph comprising a rigid transparent support, a transparent composite image layer carried by said support, a lenticular selector net secured in juxtaposed relation to one surface of said support, and an opaque light reflecting and light diffusing element secured in juxtaposed relation to the other surface of said support, said element having one surface formed to provide a multiplicity of parallel flutes of scalene triangular cross section directed towards said image layer.

MAURICE BONNET.

REFERENCES CITED

The following references are of record in the file of this patent:

UNITED STATES PATENTS

| Number | Name | Date |
|---|---|---|
| 1,150,374 | Kanolt | Aug. 17, 1915 |
| 1,858,975 | Bois | May 17, 1932 |
| 2,140,702 | Kanolt | Dec. 20, 1938 |
| 2,149,171 | Grote | Feb. 28, 1939 |

FOREIGN PATENTS

| Number | Country | Date |
|---|---|---|
| 410,517 | Great Britain | May 18, 1934 |
| 852,964 | France | Nov. 18, 1939 |